UNITED STATES PATENT OFFICE.

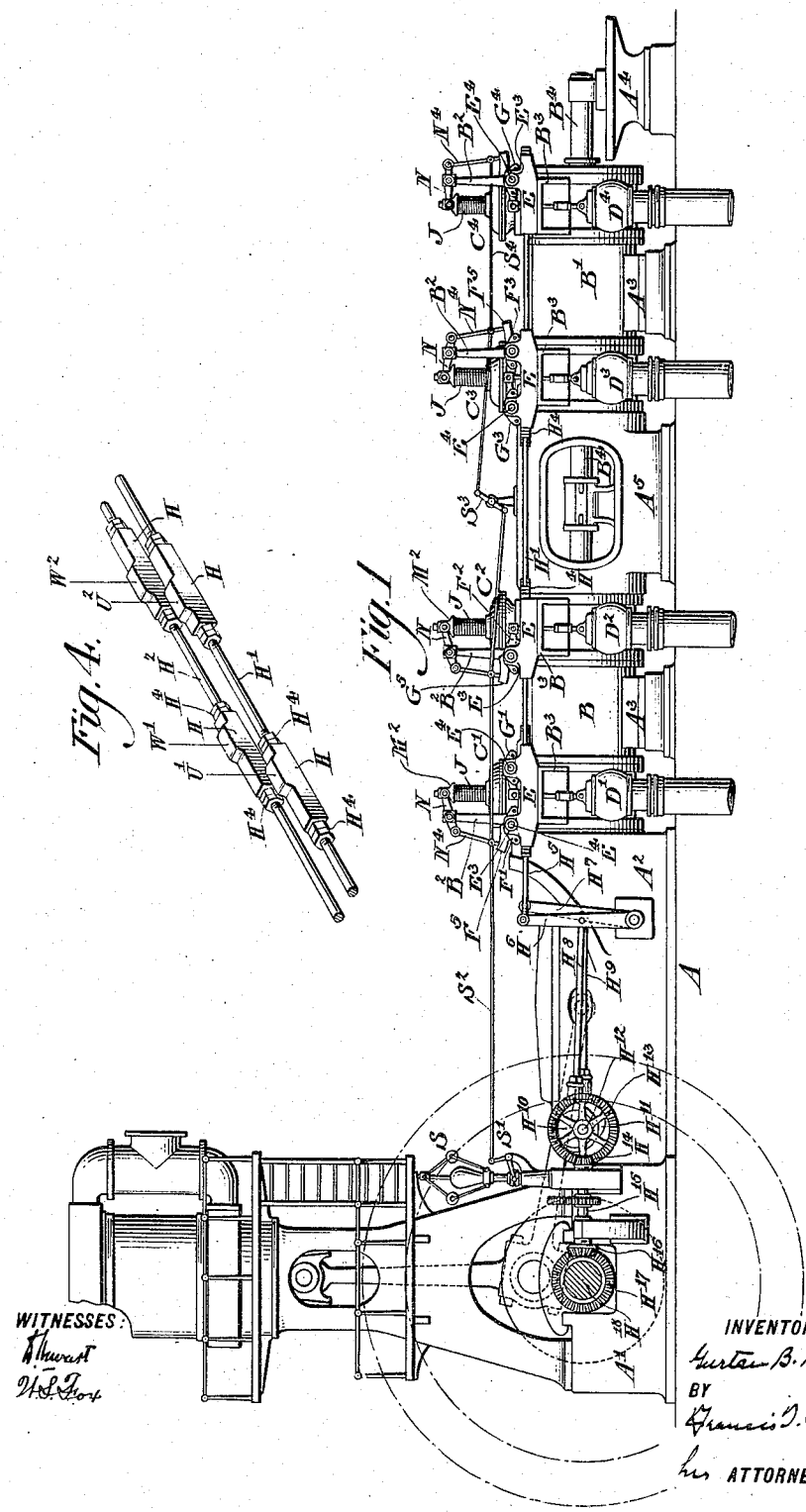

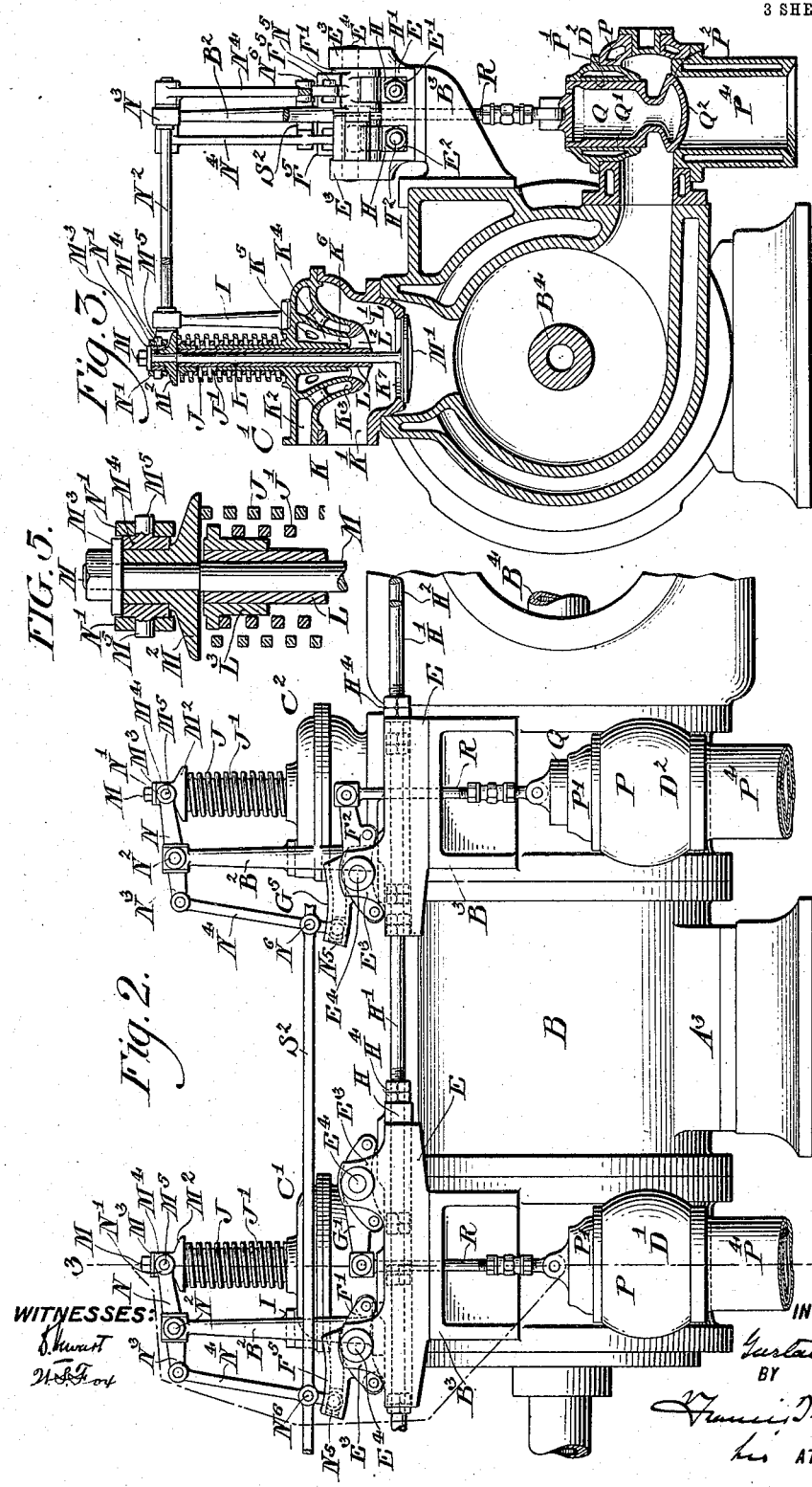

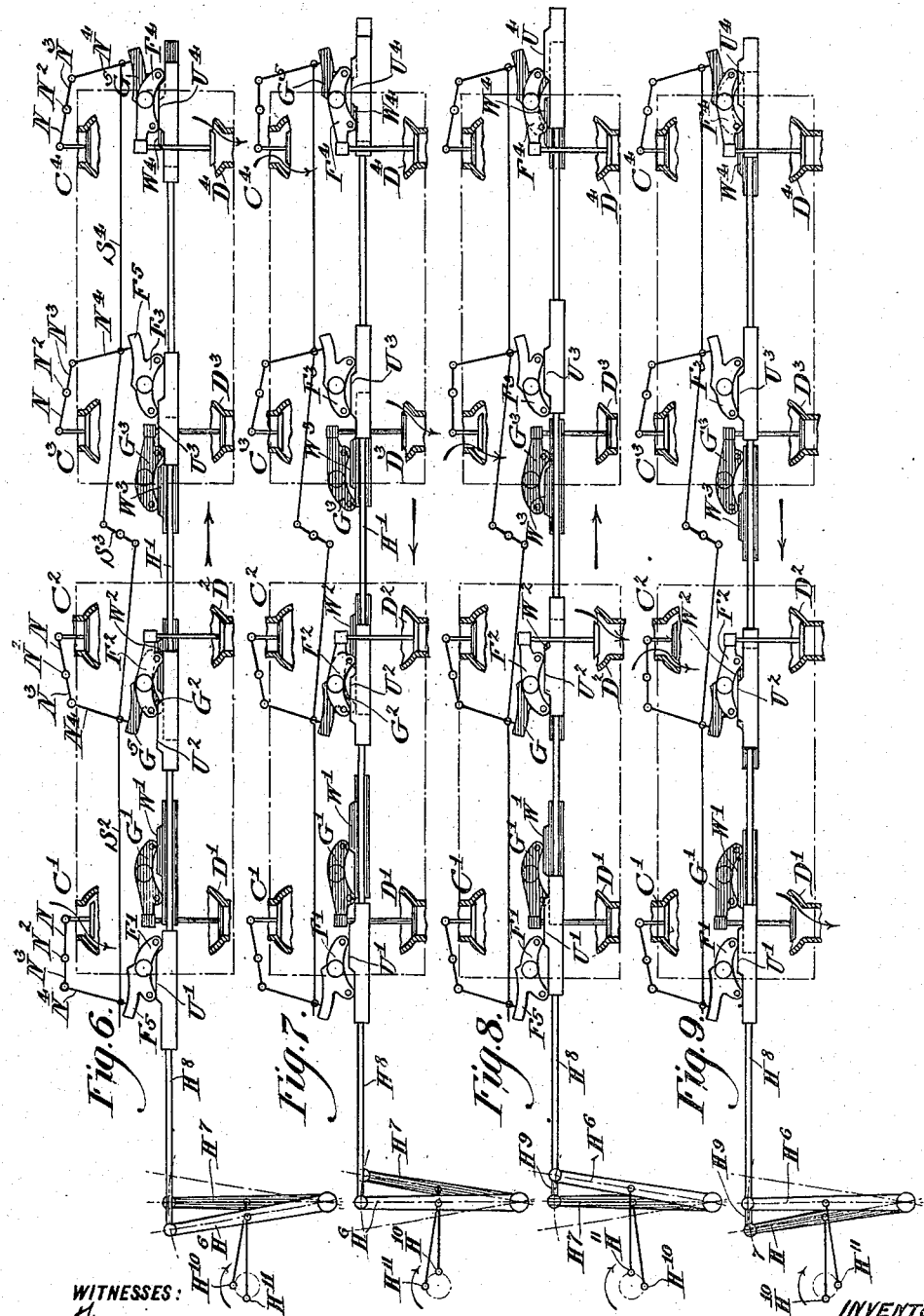

GUSTAV B. PETSCHE, OF PHILADELPHIA, PENNSYLVANIA, ASSIGNOR TO SOUTHWARK FOUNDRY & MACHINE COMPANY, OF PHILADELPHIA, PENNSYLVANIA, A CORPORATION OF PENNSYLVANIA.

ADMISSION-VALVE AND VALVE-ACTUATING MECHANISM FOR GAS-ENGINES.

No. 905,224.  Specification of Letters Patent.  Patented Dec. 1, 1908.

Application filed January 9, 1905. Serial No. 240,151.

*To all whom it may concern:*

Be it known that I, GUSTAV B. PETSCHE, a subject of the Emperor of Germany, residing in the city and county of Philadelphia, in the State of Pennsylvania, have invented a certain new and useful Improvement in Admission-Valves and Valve-Actuating Mechanism for Gas-Engines, of which the following is a true and exact description, reference being had to the accompanying drawings, which form a part thereof.

My invention relates to gas engines and particularly to the construction and mode of operation of the admission valves by which air and gas are admitted to the engine cylinders.

The object of my invention is to provide simple and efficient admission valves and to generally improve the mode of operating such valves, and the nature of my improvements will be best understood as described in connection with the drawings in which they are illustrated and in which—

Figure 1, is a side elevation of a gas engine of the four cycle type, embodying my improvements. Fig. 2, is a side elevation on an enlarged scale of one of the cylinders with the valve mechanism appurtenant thereto. Fig. 3, is a cross-section through the cylinder and valves, taken as on the line 3—3 of Fig. 2. Fig. 4, a perspective view of the reciprocating cams by which my valves are actuated in the construction illustrated. Fig. 5, is an enlarged detail view showing a feature of construction which is not shown in Fig. 3 on account of the small scale of that drawing. Figs. 6 to 9, are diagrammatic views illustrating the general system for operating the valves and for effecting a proper regulation of the admission.

A, indicates the base on which the engine is supported; A', the housing for the main shaft, a blowing engine being illustrated as also supported thereon. $A^2$, the main bed of the engine, $A^3$, $A^3$, the supports for the engine cylinders. $A^4$, $A^4$, a support for the outer end of the piston rod. $A^5$, $A^5$, the distance piece intervening between the two cylinders illustrated.

B, and B', are the cylinders of the engine. C', $C^2$, and $C^3$, and $C^4$, the admission valves; D', $D^2$, $D^3$, and $D^4$, the exhaust valves. On each cylinder of the engine are supported two brackets indicated at $B^3$, $B^3$, etc., these brackets in turn supporting guideways E, E, etc., in which are formed parallel guides E', $E^2$, and from which guides E, extend the bearings $E^3$, $E^3$, which support the pivot pins indicated at $E^4$. The guide castings E, as shown, are also used to support the upright standards indicated at $B^2$, $B^2$, etc. Pivoted on the pivot pins $E^4$, are the two sets of rock levers F', $F^2$, $F^3$, and $F^4$, and G', $G^2$, $G^3$ and $G^4$.

H, H, etc., are cam carrying guides moving in the guideways E', and $E^2$, and secured to and actuated by the two sets of rods indicated at H', and $H^2$, four of the slides being secured to each rod in the construction shown; the mode of securing indicated being through nuts $H^4$, which permit the adjustment of the slides on the rods. The two rods H', and $H^2$, are connected through rods $H^5$, with the rock levers indicated at $H^6$, and $H^7$, and which, in turn, are connected through the rods $H^8$, and $H^9$, with the eccentrics $H^{10}$, and $H^{11}$, secured on the shaft $H^{12}$, which is actuated through bevel gears $H^{13}$, and $H^{14}$, by the shaft $H^{15}$, which in turn is driven through the bevel gears $H^{16}$, and $H^{17}$, by the main shaft $H^{18}$.

I, I, etc., are standards secured on the tops of the admission valves as shown and arranged so that one lies in the same transverse plane with each standard $B^2$.

K, K, etc., indicate the admission valve casings which, as shown, are formed with air chambers K', having valve seated ports $K^7$, leading into the engine cylinder and gas chambers $K^2$, which extend down into the air chambers in an annular ring as indicated at $K^3$, so as to surround and inclose, except at the bottom, a supplemental air chamber $K^4$, the upper part of which is in free communication with the main air chamber K', through ports indicated at $K^5$.

$K^6$, indicates a guideway extending through the center of the air chamber $K^4$, as shown, the guideway $K^6$, supports and guides a sleeve spindle L, the lower end of which supports through the arms $L^2$, an annular valve L', which is adapted to open and close the port leading from the annular gas chamber $K^3$. To the upper end of the sleeve spindle is secured the head indicated at $L^3$, and the valve is held to its seat by resilient pressure provided by a spring indicated at J'.

Through the center of the sleeve spindle L, passes the spindle M, to the lower end of which is attached the main valve which opens and closes the port K⁷, while to the top of this spindle M, is secured the head M², at a point which, when both the valves M', and L', are seated will result in leaving a clearance between the heads L³, and M², of an eighth of an inch or thereabouts. By preference I use a spring J, acting to hold the valve M', to its seat.

A trunnioned collar M⁴, M⁵, is secured to the top of the head M², by a nut indicated at M³, and the trunnions M⁵, are engaged by the forked ends of a lever arm N, secured to one end of a rock shaft N², which is supported in the standards B², and I', and the other end of which is connected through a lever N³, with a link N⁴, having a slide block at its lower end, as indicated at N⁵, said slide blocks being engaged with the slotted segments indicated at F⁵, and G⁵; the segments F⁵, being secured to members of the rock lever set marked F', F², etc., and the segments G⁵, etc., being secured to members of the rock lever set marked G', G², etc., the rock levers provided with these segments being of course those which in the organization of the engine have apportioned to them the work of operating the inlet valves. N⁶, N⁶, etc., indicate pivot pins attached to the links N⁴, N⁴, and connected with the rods S², and S⁴, which, see Fig. 1, are connected together through the rock lever S³, while the rod S², is connected through the bellcrank lever S', with the governor indicated at S.

The construction of the exhaust valves D', D², etc., is indicated in Fig. 3, P, indicating the valve casing, P', a detachable cylindrical bearing for the valve, P⁴, a detachable exhaust connection provided with a valve seat P².

Q, is the valve having a cylindrical portion guided in the guideway P', and a valve portion Q².

R, R, etc., indicate rods by which the valves are connected with the rock levers actuated by the cams.

The cam surfaces secured on the blocks H, are indicated at U', U², etc., for the front series of slides actuated by the rod H', and at W', W², etc., for the rear series actuated by the rod H².

Before going further with the description, I will state here that the general system of valve actuation through the two sets of reciprocating cams, while new with me, is not claimed in this application, but forms the subject matter of my application Serial Number 238,917 filed December 30, 1904 and also that the exhaust valve construction illustrated in Fig. 3 is not claimed in this application as it forms the subject matter of my other application for Letters Patent Serial Number 304,626 filed March 7th, 1906.

The general system and mode of operation of the valves is well shown in the series of diagrammatic Figs. 6 to 9 inclusive, which illustrate the consecutive positions of the eccentrics H¹⁰, and H¹¹, during one complete cycle of operation of the engine, corresponding to a double reciprocation of the pistons, the eccentrics making one revolution for each two revolutions of the main shaft.

Passing to the special valve arrangement illustrated in Figs. 3 and 5, it will be seen that when the appropriate cam at the proper time actuates through the rock lever N², the valve opening in lever N, that the valve M', will first open permitting the air from the chamber K', to pass into the cylinder, the further downward movement of the head M², at the top of the valve spindle bringing it into contact with the head L³, and depressing the valve spindle L, and through it opening the annular valve L', which permits the gas to pass into the chamber K', and mixed with the air to pass into the engine cylinder. The effectual mixture is further permitted by the annular form of the gas outlet and the fact that air is admitted to and through the supplemental air chamber K⁴, so that the gas escapes in an annular jet sandwiched, so to speak, between a core of air and a jacket of air. On the reverse motion of the valve actuating lever N, the valves move up together, but the spring J', acting on the gas valve brings it to its seat before the main valve M', closes the admission port. Therefore a certain amount of air unmixed with gas passes into the cylinder at the end of the inlet portion so that the portion of the port left below the valve M', contains in effect air not an explosive mixture.

The regulation of the engine is effected through the governor acting on the slide blocks N⁵, and adjusting them toward or from the centers E⁴, of the levers to which the slotted segments are secured. The effect is of course to effect a throttling of the air and gas. I would further call attention to the simplicity and general effectiveness of the mechanism by which the motion of the cams is in the construction illustrated communicated to the valves, the employment of the rock shafts N², enabling me to use comparatively short rock levers, and to arrange them so that they are as little in the way as possible.

Having now described my invention, what I claim as new and desire to secure by Letters Patent is,

1. In a gas engine, an admission valve casing having an air chamber K', an annular gas chamber K², K³, extending into said air chamber K'; and forming an interior chamber K⁴, open channels passing through the annular gas chamber establishing communication between the air chamber K' and the air chamber K⁴, in combination with a main valve M', arranged to open and close the port from the chamber K' to the cylinder, an annular valve L', arranged to open and close the exit port of the annular gas chamber and means for actuating said valves.

2. In a gas engine, an admission valve casing having an air chamber K', an annular gas chamber K², K³, extending into said air chamber K', and forming an interior chamber K⁴, open channels passing through the annular gas chamber establishing communication between the air chamber K' and the air chamber K⁴, in combination with a main valve M', arranged to open and close the port from the chamber K', to the cylinder, a valve stem M, attached to said valve and extending through the casing, an annular valve L', arranged to open and close the exit port of the annular gas chamber, a sleeve stem L, attached to said valve and surrounding stem M, a head secured to stem M, above the end of sleeve stem L, and at a point which results in the clearance between said head and the end of the sleeve stem when valves M', and L', are both closed, a spring arranged to draw stem L, upward and to close valve L', and means for reciprocating stem M, and through it depressing stem L.

3. In a gas engine having an admission valve casing with air and gas chambers a port leading from the air chamber to the cylinder and a port from the gas chamber to the air chamber, the combination therewith of a main valve controlling the port to the cylinder and having a stem leading through the casing, a gas valve for the gas port secured to a sleeve stem surrounding the main valve stem, means whereby the motions of the main valve stem communicate motion to the sleeve stem shortly after the main valve is opened and so that the gas valve opens after and closes before the main valve, means for moving the main valve stem synchronously with the movements of the piston, and means whereby the extent of such movement and the consequent opening of the gas valve can be varied.

4. In a gas engine having an admission valve casing with air and gas chambers a port leading from the air chamber to the cylinder and a port from the gas chamber to the air chamber, the combination therewith of a main valve controlling the port to the cylinder and having a stem leading through the casing, a gas valve for the gas port secured to a sleeve stem surrounding the main valve stem, a head secured to the main stem so as to lie a short distance above the end of the sleeve stem when both valves are closed and to come in contact with and depress the sleeve and its valve after the main valve is opened, a reciprocating cam moving in fixed relation with the piston movements, a lever actuated by said cam and having a guide segment secured thereto, a rock shaft N², extending transversely to the cylinder, a lever N³, secured to one end of said shaft and connected to the segment by a link and slide block, a lever N, secured to the other end of the rock shaft and connected to the top of the main valve spindle, and means for adjusting the slide in the segment to vary the extent of the movement imparted to the valves.

5. In a gas engine having two sets of reciprocating cams actuated by eccentrics or the like moving in fixed relation to the movements of the piston, the combination of a series of levers each actuated by one of said cams, and connected to actuate the engine valves, a guide segment secured to each lever connected with an inlet valve and forming a part of the valve actuating connection, a slide block also forming a part of the valve actuating connection moving in each segment, a governor, and means connecting said governor with the slide blocks to shift them all simultaneously in their segments.

GUSTAV B. PETSCHE.

Witnesses:
CHAS. F. MYERS,
D. STEWART.